July 12, 1960    J. RAAMOT    2,945,185
PULSING SYSTEM
Filed Nov. 19, 1957
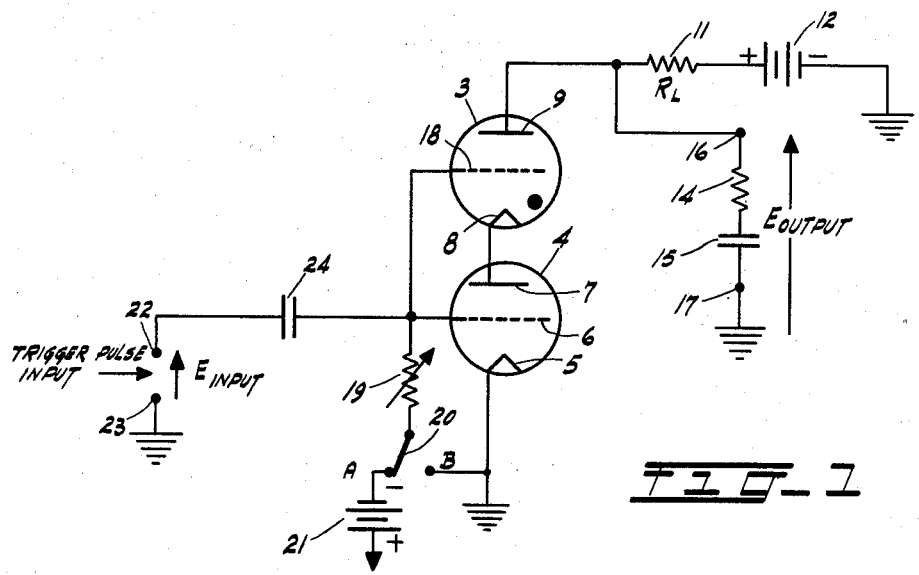
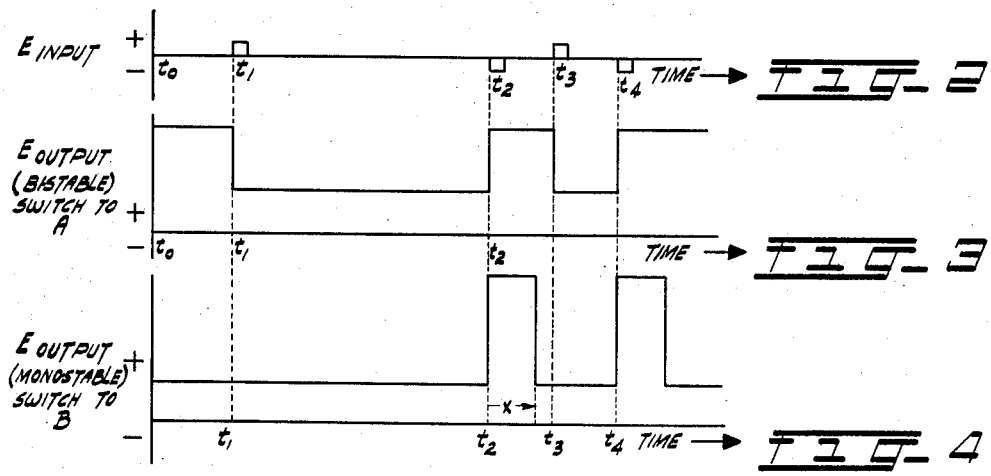
INVENTOR
J. RAAMOT
By W.C.Parnell
ATTORNEY

United States Patent Office 2,945,185
Patented July 12, 1960

2,945,185
PULSING SYSTEM

Jaan Raamot, Cresskill, N.J., assignor to Western Electric Company, Incorporated, New York, N.Y., a corporation of New York Filed Nov. 19, 1957, Ser. No. 697,368

1 Claim. (Cl. 328—199)

This invention relates to improvements in pulse generating or pulsing systems and particularly to a pulse generating system which may operate in either a bistable or monostable manner.

Various bistable and monostable pulsing and trigger type circuits are utilized in present-day radar and computer systems. In addition, these circuits find application in certain testing systems, particularly where the condition of the circuit is to be monitored or its frequency or time of operation is to be determined. For some of the aforementioned applications, it is desirable to have a single pulsing circuit which is operable either in a bistable or a monostable mode. One specific application for such a dual-function circuit is in the testing of telephone dials, making it possible to use a minimum of test equipment to perform the required tests. Pulsing circuits may be used in these tests to store information in memory devices until needed. For example, in one test for determining whether or not the ratio between the open and closed conditions of the dial breaker contacts, for a particular operation of the dial, is adequate to perform the signalling function, information for determining the total length of time the contacts are closed may be obtained with the circuit operated in its bistable mode to charge a condenser during the periods when the contacts are closed. In another test for ascertaining that the number of operations of the dial contacts correspond to the number dialed, the circuit is operated in its monostable mode to charge a condenser for a fixed time interval every time the contacts are closed.

One of the objects of the invention is a system which may be used in both monostable and bistable modes of operation.

Another object is a pulsing system capable of bistable operation such that the external load circuit remains in one or the other of two conditions of stable equilibrium until some external signal or trigger pulse is applied to the system at which time the load circuit will be switched to the other of its stable conditions.

Still another object is an improved and simple monostable generator for producing pulses of a predetermined time duration each time a trigger pulse of a prescribed polarity is received.

According to the general features of the invention, a system for delivering pulses to an external load circuit comprises a thyratron tube connected in the plate circuit of a multi-element vacuum tube having at least a cathode, a plate, and a grid. The grids of the two tubes are tied together and, for bistable operation, are biased to cut-off through a grid resistor. For monostable operation, the grid resistor is connected directly to ground and the tubes are normally conducting. In either case, the output pulses are taken from the plate of the thyratron and the load is in parallel with the tubes. Whenever the tubes are non-conducting, that is, biased below cut-off or below the required firing potential, the impedance across them is substantially infinite and a high voltage is available across the external load. When the tubes are rendered conducting, however, the series impedance of the tubes is reduced to a low value so that the voltage across the external load, which can be no more than the voltage across the tubes, is pulled down to a low value.

These and other features of the invention will be more fully understood from the following detailed description taken in conjunction with the accompanying drawing, in which:

Fig. 1 is a schematic circuit diagram of a pulse generator circuit incorporating the general features of the invention;

Figs. 2, 3 and 4 are voltage versus time curves illustrating typical input pulses and corresponding output voltages for the two conditions of operation of the circuit of Fig. 1.

The pulse generator shown in the drawing has a thyratron 3 connected in the plate circuit of a vacuum tube 4 having at least three electrodes including a cathode 5, a grid 6 and a plate 7. The thyratron cathode 8 is connected directly to the plate 7 while its plate 9 is connected through a current limiting resistance element 11 to the positive side of a supply of plate potential 12, the negative side being connected to ground. An external load, for example, a serially connected resistance element 14 and a condenser 15 (which may be a condenser to be charged in accordance with the aforementioned tests for telephone dials) are connected between output terminal 16, connected to the thyratron plate 9, and the output terminal 17, connected directly to ground. The external load then is connected in parallel with the two tubes 3 and 4 and in series with the plate supply 12 and limit resistor 11. The grid 6 of the vacuum tube and the control electrode or grid 18 of the thyratron are directly tied together and are connected through a grid resistor 19 to a two-position switch 20 for connecting the grids to a grid bias supply 21 required for bistable operation of the circuit when the switch is in position "A," and directly to ground for monostable operation when the switch is in position "B." Input pulses for triggering or controlling the operation of the control circuit are applied between a terminal 23, connected directly to ground, and a terminal 22 connected to the grids through a coupling condenser 24. These pulses may be, for example, pulses received from a telephone dial circuit in the aforementioned tests.

For bistable operation, switch 20 is set to the "A" position wherein the source 21 biases the grid 18 of the thyratron below the breakdown voltage value and a grid 6 of the vacuum tube below its cut-off value. When the thyratron is in its extinguished state, the vacuum tube plate supply path is open circuited and no space current flows in the tubes. In this condition, the series connected tubes offer substantially infinite impedance in shunt with the external load, consequently, a high potential appears across the external load ($E_{output}$). When a positive polarity pulse is applied across the input terminals 22 and 23, the thyratron fires and the vacuum tube is rendered conductive drawing space current from the source 12. Once a thyratron conducts the grid of the thyratron is at a voltage comparable to its cathode and draws sufficient current to raise the bias on the grid of the vacuum tube to a value sufficient to maintain conduction in the tube. When the tubes conduct, the impedance of the shunting path is substantially reduced to a value equal to the sum of the plate resistances. Consequently, the voltage across the load is reduced substantially. The larger the resistance of the load, the larger the difference between the voltage across it for the two circuit conditions. The tubes remain in their conducting state until a negative input pulse is applied to the grids to lower the bias on the vacuum tube grid below its cut-off value. The vacuum tube thereupon ceases to conduct and thereby extinguishes the thyratron. The circuit operates in this state until another positive polarity trigger pulse is applied to the input. Fig. 3 shows the output voltage "E$_{output}$" corresponding to the succession of positive and negative input pulses shown in Fig. 2. From these curves it is seen that when the tubes are normally non-conducting as at time "$t_0$," the output voltage "E$_{output}$" across the external load is at its highest value. It is at this time that the impedance of the series connected tubes is at a maximum or infinite value. At "$t_1$," when a positive pulse is applied across the input, the tubes are rendered conductive to lower the impedance path in parallel with the external load thereby greatly reducing the potential across the external load (E$_{output}$ drops down to a low value). This condition continues and is not changed until a negative pulse is applied to the input at "$t_2$" when the tubes are rendered non-conducting and the voltage across the external load "E$_{output}$" again is increased to its high value. When the next positive input pulse is delivered across the input terminals at time "$t_3$," the tubes are again rendered conducting and the output voltage across the external load is again reduced and remains so until the next negative pulse at "$t_4$."

For monostable operation, switch 20 is set to its "B" position and the grid resistance 19 adjusted so that the tubes are biased slightly above cut-off or above the required firing potential. A negative input pulse which is sufficiently large to drive the vacuum tube below cut-off renders the vacuum tube non-conducting and thereby extinguishes the thyratron. The tubes remain in this state until the input coupling capacitor 24 discharges through the grid resistor 19 sufficiently for the grid voltage to return above cut-off and above the value required for firing the thyratron at which time the tubes are rendered conducting again. As seen in Fig. 4, the output voltage "E$_{output}$" across the load then will normally be at a low value while the tubes are conducting and offer a low impedance path in parallel with the external load. As soon as the first negative pulse is applied at "$t_2$," the tubes are extinguished or rendered non-conducting, the output potential "E$_{output}$" is raised to a high value until the tubes become conducting again, for example, at "$t_2+x$" ("$x$" being the time required for the coupling capacitor to discharge sufficiently after a negative input pulse has been applied thereto to raise the bias on the tube to render them conducting). The circuit remains in this condition until the next negative polarity pulse is applied to the input (at time "$t_4$") when the aforementioned action is repeated. The time constant of condenser 24 and resistor 19, of course, may be chosen to give a desired pulse duration corresponding to the input pulses utilized to trigger the action.

In either the bistable or the monostable operation, the triggering of the circuit is unaffected by changes in plate current and, since the circuit does not have regenerative feedback as in conventional multi-vibrator circuits, somewhat larger triggering pulses are required for its operation. The time required for the transition from the non-conducting to the conducting states to be complete depends on the breakdown time of the thyratron. This is about five microseconds for commercial tubes. The transition time from the conducting state to the non-conducting state is approximately equal to the rise time of the trigger pulse waveform. By varying relative impedance between the external load and the conducting, serially connected tubes, the maximum and the minimum output voltages may be varied to desired values.

A typical circuit for producing output voltages "E$_{output}$" varying in the order of 250 volts between the conducting and non-conducting conditions of the tubes (with a load resistor 14 of 800,000 ohms, and condenser 15 of 0.5 microfarad) utilizes a type 5696 thyratron, a type 5965 triode, a 300 volt plate supply 12 with a 62,000 ohm plate resistor 11, a grid bias supply 21 of ten volts; a grid resistor 19 of 1.3 megohms and a coupling condenser 24 of 0.01 microfarad. For monostable operation, switch position "B," the grid resistor 19 is easily set either to a predetermined position or varied until both tubes start conducting.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

A pulse generator comprising a vacuum tube having at least a cathode, a grid, and plate, a thyratron tube, an external load circuit connected to the plate of the thyratron, a conductive connection between the plate of of the vacuum tube and the cathode of the thyratron, a low resistance conductive connection between the grids, means for biasing the grids so that the vacuum tube grid is below cut-off value, and the thyratron is below its firing point, auxiliary biasing means for the grids for rendering the tubes normally conducting, a switch for selectively connecting the biasing means or the auxiliary biasing means to the grids for bistable or monostable operation respectively, a source of direct current energy for supplying space current to the tubes and operating potential to the external load, and means for applying triggering pulses to the grids to selectively render the tubes conducting or non-conducting depending on the polarity of the pulses when the switch is positioned to connect the biasing means to the grids and for interrupting conduction of the tubes when pulses of a particular polarity are applied to the grids and the switch is positioned to connect the auxiliary biasing means to the grids.

References Cited in the file of this patent

UNITED STATES PATENTS

| | | |
|---|---|---|
| 2,061,011 | Vingerhoets | Nov. 17, 1936 |
| 2,404,754 | Simpson | July 23, 1946 |
| 2,647,240 | Todd | July 28, 1953 |